United States Patent

[11] 3,577,141

[72] Inventor Eusebio V. Quintero
Greenville, S.C.
[21] Appl. No. 775,737
[22] Filed Nov. 14, 1968
[45] Patented May 4, 1971
[73] Assignee United Merchants and Manufacturers, Inc.
New York, N.Y.

[54] BINARY TO DECIMAL TREE RELAY DECODER CIRCUIT WITH MEMORY DISPLAY
4 Claims, 7 Drawing Figs.

[52] U.S. Cl. .......... 340/347, 340/324, 235/155, 179/18, 340/147
[51] Int. Cl. .......... G06f 5/00
[50] Field of Search .......... 340/347, 147 (T), 324; 235/154, 155; 179/18 (TR)

[56] References Cited
UNITED STATES PATENTS

| | | | |
|---|---|---|---|
| 2,405,603 | 8/1946 | Parker et al. | 340/147T |
| 2,424,243 | 7/1947 | Lowell | 340/147T |
| 2,745,093 | 5/1956 | Holman et al. | 235/155X |
| 2,826,360 | 3/1958 | Sih Hsuin Tsiang | 340/347X |
| 2,939,913 | 6/1960 | Durkee | 340/147T |

*Primary Examiner*—Maynard R. Wilbur
*Assistant Examiner*—Charles D. Miller
*Attorney*—B. B. Olive

ABSTRACT: A binary to decimal decoding or translating circuit for the displaying or storing of decimal data from binary inputs uses latching relays in a tree relay type circuit, the selective energization of the latching coils for the establishment of paths to produce particular decimal displays being dependent upon operation of unlatching coils within a relatively short time period followed by operation of a control nonlatching relay within a longer but relatively brief time period such that new binary data may be fed into or removed from the circuit while previously fed binary data is held displayed or stored in memory.

PATENTED MAY 4 1971 3,577,141

INVENTOR.
Eusebio V. Quintero

BY B. B. Olive

ATTORNEY

PATENTED MAY 4 1971 3,577,141

SHEET 2 OF 3

INVENTOR.

Eusebio V. Quintero

BY

B. B. Olive

ATTORNEY

INVENTOR.
Eusebio V. Quintero
BY
B. B. Olive
ATTORNEY

BINARY TO DECIMAL TREE RELAY DECODER CIRCUIT WITH MEMORY DISPLAY

BACKGROUND OF THE INVENTION

1. Field of the Invention

The invention is generally directed to circuits for translating from one numerical system to another and particularly from binary to decimal where the circuit exhibits memory and displays the decimal output. By "memory " is meant the ability to receive a new binary input into the circuit or to remove a previous binary input that has not been displayed without disturbing the last displayed decimal output. The invention is particularly directed to a tree relay type translating circuit which exhibits such a memory and which is also characterized by the ability to be multiplexed.

2. Description of the Prior Art

Binary to decimal translating circuits are shown extensively in the prior art and electronic translating circuits having a "-memory" are commercially available. Furthermore, one can find translating circuits in both the patent art and in textbooks where the translation is accomplished through a tree relay type circuit. See for example—U.S. Pat. Nos. 2,872,114, 2,909,768 and 3,242,323. Also see Chapters 6 and 12 of the book "The Design of Switching Circuits," (1951), D. Van Nostrand Company, Inc., Publisher.

Electronic, e.g. solid-state, translating circuits are inherently sensitive to noise and because of this cannot be practically multiplexed because of the transfer of transient noise between circuits. Such electronic translating circuits are furthermore difficult to repair in the field and lack the inherent ruggedness frequently required in industrial applications.

In comparison to electronic translating circuits, tree relay translating circuits are inherently more rugged and do not exhibit the undesirable noise transfer characteristic of the presently available electronic translating circuits. However, such tree relay translating circuits as have been disclosed in the literature to date do not exhibit a memory nor do they lend themselves to multiplexing.

SUMMARY OF THE INVENTION

The invention is directed to a binary to decimal translating circuit using latching-type relays arranged in a tree relay array. The binary data controls the latching of the relays and produces a decimal display according to the establishment of latching paths. The relay coils energization is in turn dependent upon activation of a control relay. The control relay coil controls two sets of contacts which operate after a short time delay during which the unlatching coils are operative. The control relay coil itself depends for energization on a set of separate master control contacts which may be under computer or other external control. Closing of the master control contacts first causes the unlatching coils to be energized and the circuit brought to the "zero" display, i.e. the circuit is purged of any prior display. The unlatching coils are then deenergized and the latching coils are energized which causes to be passed to the display unit a signal equivalent to whatever binary data has been put into the circuit. A particularly valuable feature of the circuit is the fact that the latching relays may remain latched in their last display mode while old binary input data is removed and new binary input data is put in thus allowing a "memory." The circuit has the further advantage of being adapted to multiplexing.

A general object of the present invention is therefore to provide a rugged translating circuit which is insensitive to noise, and which exhibits a memory and consequently is adapted to multiplexing.

Another object is to provide an improved tree relay type translating circuit which exhibits a memory and thus adapts to multiplexing.

The foregoing and other objects will appear as the description proceeds.

DESCRIPTION OF PREFERRED EMBODIMENT

Figure 1:
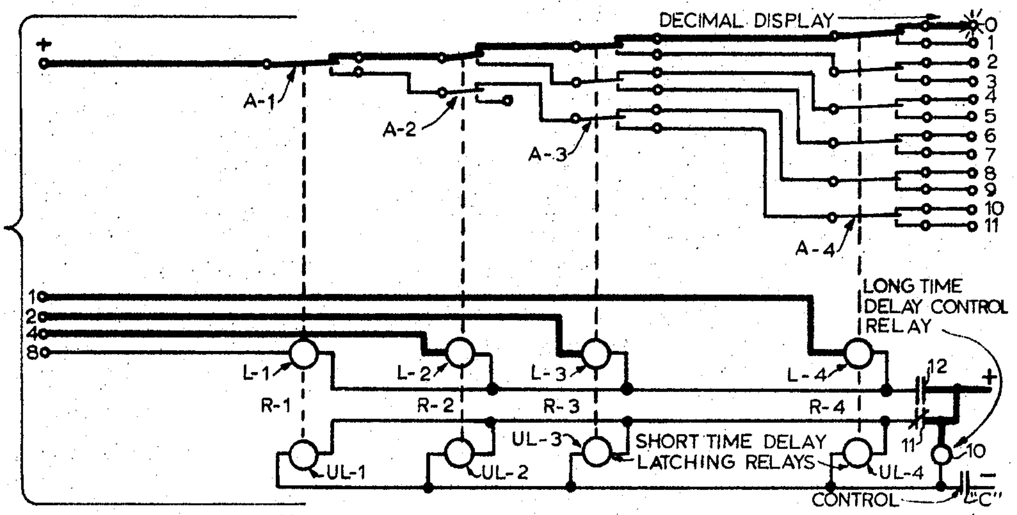
FIG. 1 is a circuit diagram of a translating circuit embodying the invention and showing in heavy lines the O display and the "setting" of the binary inputs for the decimal 7 but prior to actual display of 7.
Figure 7:
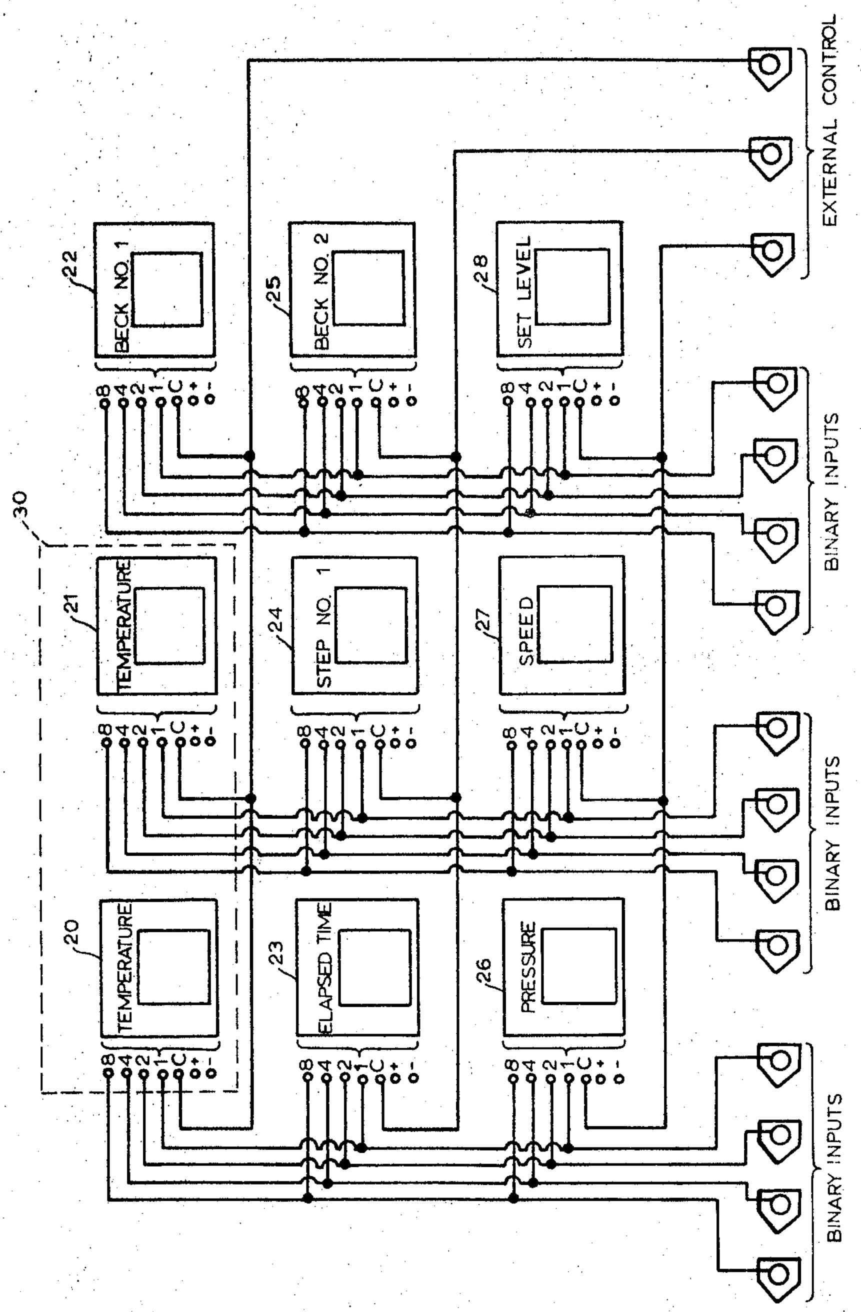
FIG. 7 shows a matrix adapted to connect to a plurality of individual translating circuits of the type shown in FIG. 1.

The basic circuit shown in FIG. 1 includes a set of four binary inputs labeled 1, 2, 4, 8. The data in case of application to a textile dyeing operation may originate in binary form and, as shown in FIG. 7, represent after conversion to decimal form, a temperature, speed, elapsed time, a pressure, the status of a particular step, a set level or the status of a particular beck. The purpose of the circuit of the invention is of course to convert such binary input data to decimal data which can be stored on tape or the like or in the case of the present embodiment be displayed.

In FIG. 1 a group of four latching relays R–1, R–2, R–3 and R–4 are provided with respective latching coils L–1, L–2, L–3, L–4 and unlatching coils UL–1, UL–2, UL–3, and UL–4. Relay R–1 control contact arm A–1, relay R–2 controls contact arms A–2, relay R–3 controls contact arms A–3 and relay R–4 controls contact arms A–4. Upon energization of the appropriate latching coil e.g. latching coil L–1, the corresponding arm or arms, e.g. arm A–1, will be drawn down and latched and will remain latched after the latching coil has been deenergized. Upon energization of the corresponding unlatching coil e.g. unlatching coil UL–1, the arm will be restored to its first position.

Energization of both the latching coils and the unlatching depends upon the closing of a set of normally open contacts labeled "C" and which in turn is controlled by a suitable external control labeled "Control" and which may for example be a computer program control. Closing of contacts "C" provides a path for energizing a control relay having a coil 10 which in turn controls a normally closed contract 11 and a normally open contact 12. The unlatching coils UL–1, UL–2, UL–3 and UL–4 are energized through contact 11 and the latching coils L–1, L–2, L–3 and L–4 are energized through contact 12.

Figure 2:
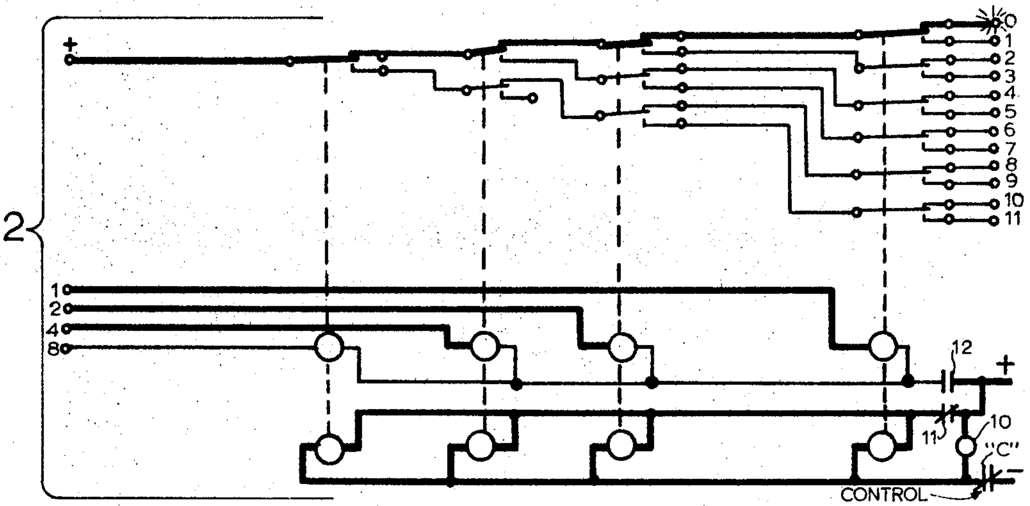
FIG. 2 is like FIG. 1 but showing the external control contacts closed and in additional heavy lines how the binary input 7 is held during energization of the unlatching coils to display O prior to utilization of the binary input to energize the latching coils to cause the decimal display.

The unlatching coils UL–1, UL–2, UL–3 and UL–4 are purposely adapted to unlatch the arms within a relatively short time delay in the order of 5 milliseconds and the control relay is adapted to operate within a relatively longer but still brief time delay in the order of 15 milliseconds. Thus, when the external control, e.g. a computer control, commands contact "C" to close and it does close, the unlatching coils (UL–1, UL–2, UL–3 and UL–4) are first all energized which means that all of the sets of arms A–1, A–2, A–3 and A–4 are unlatched and put in the 0 display position as in FIGS. 1 and 2. Stated differently, even though binary data has been set into the circuit as the setting of binary 7 shown in FIGS. 1 and 2, the binary data is ineffectual to control the decimal output until after the 15 millisecond delay period and until after the circuit has been restored to 0 display.

Figure 3:
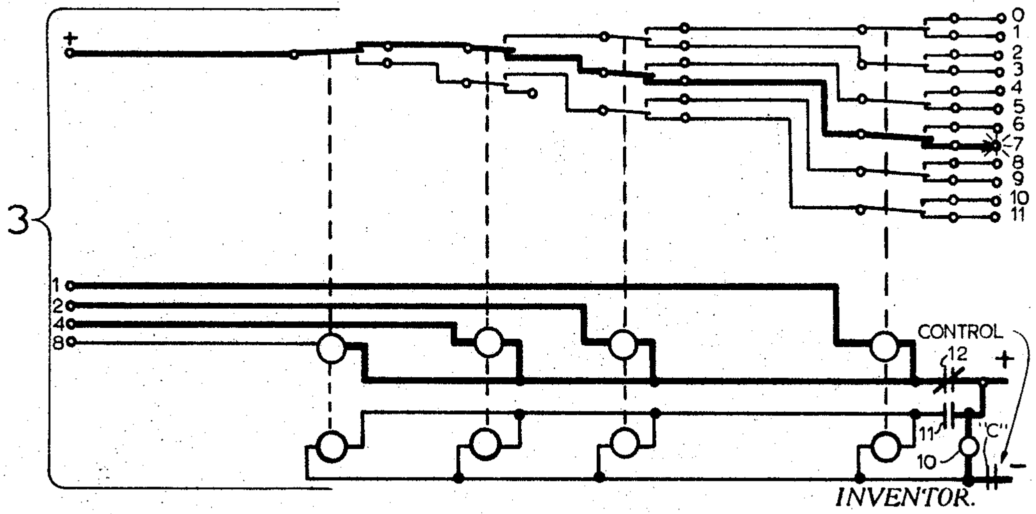
FIG. 3 is like FIG. 2 but a few milliseconds later in time and showing how the binary input energizes the latching coils to cause the number 7 to be displayed.

After the 15 millisecond delay period, coil 10 opens contacts 11 and closes contacts 12 so as to deenergize the unlatching coils and energize those latching coils which have been set with binary data inputs. For example, in FIG. 3, closing of contact 12 causes latching coils L–2, L–3 and L–4 to be energized and to latch arms A–2, A–3, and A–4 which establish a path effective to display the decimal 7 as shown in FIG. 3.

Figure 4:
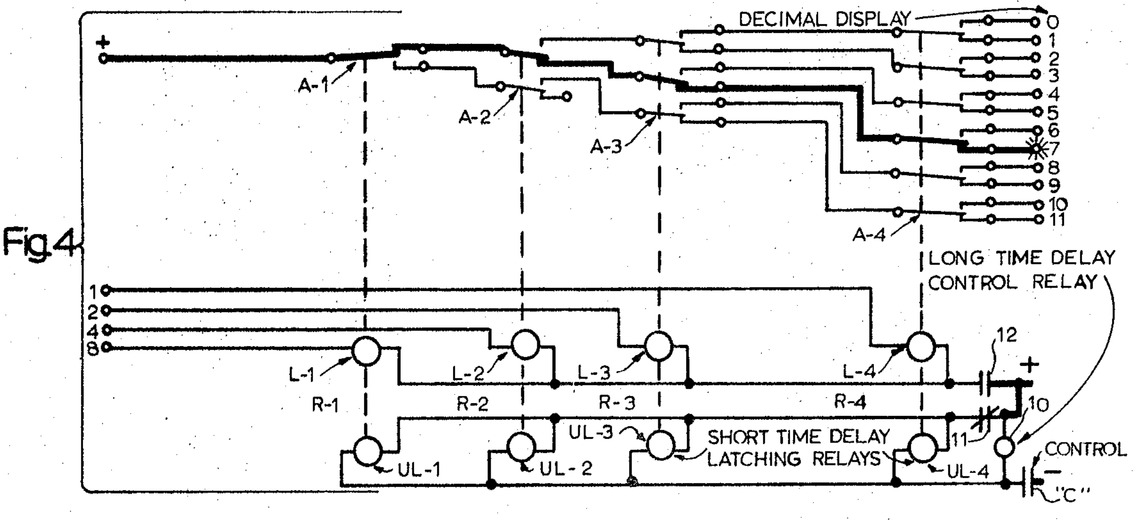
FIG. 4 shows the configuration of FIG. 3 with the control circuit deactivated, the binary 7 input removed and leaving the 7 displayed.
Figure 5:
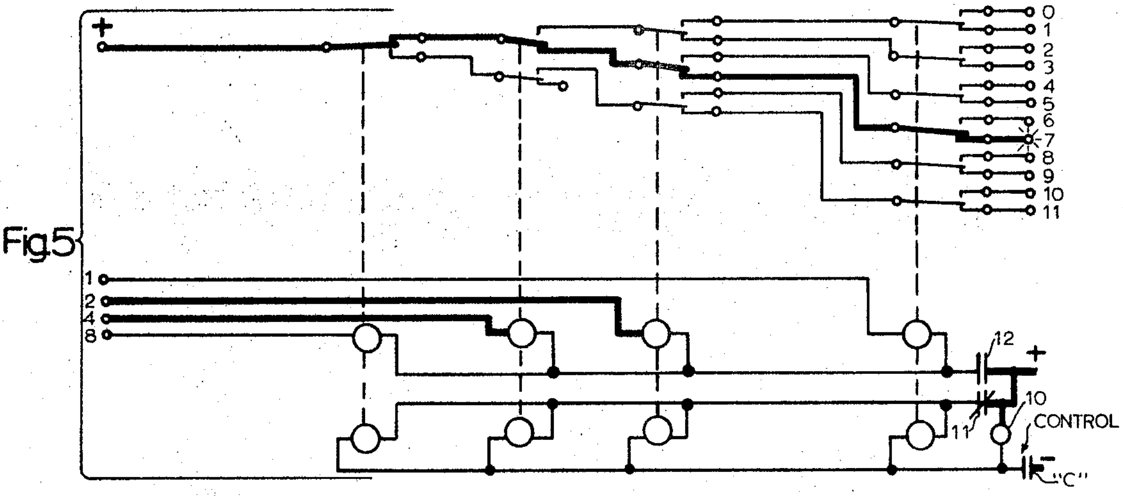
FIG. 5 shows the circuit "set" with the binary input for 6 but without disturbing the prior 7 display.
Figure 6:
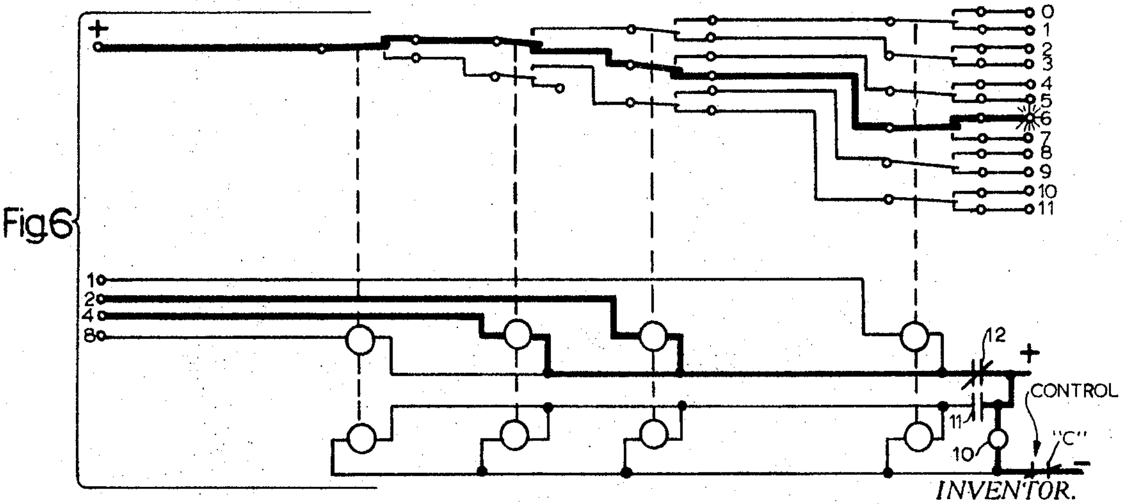
FIG. 6 shows the circuit with the decimal 6 displayed.

In the sequence of "reading out" a great number of binary input data sources each being associated with a translating circuit such as FIG. 1, the external computer control will normally maintain contacts "C" closed only long enough to read out a selected display after which contact "C" will open which causes contact 11 to resume its normally closed position and contact 12 to resume its normally open position. After contact "C" has opened, the last decimal display will, because of the use of latching relays, remain on as shown in FIG. 4. At this stage new binary data may be introduced without disturbing the previous decimal display. This is shown in FIG. 5 where new binary data 6 is set into the circuit while the 7 remains on display. FIG. 6 illustrates the state of the circuit of FIG. 5 after the sequence of the control contact "C" being closed, the contacts 11 being held closed and the contacts 12 being held open to restore the circuit to display O as in FIG. 2, the contacts 11 being opened and the contacts 12 being closed after a 15 millisecond delay and arms A–2, A–3, and A–4 being latched in the manner shown in FIG. 6 to cause the display of decimal 6.

In FIG. 7, each of the display blocks labeled respectively 20, 21, 22, 23, 24, 25, 26, 27, and 28 should be understood as representing an electrical unit which includes a translating circuit such as in FIGS. 1 through 6 and connected to the translating circuit a display unit capable of exhibiting the decimal numerals shown. As indicated by the dashed line box 30 two display units may be employed to display a 2-digit temperature. Various display devices suited to the invention are commercially available, one being made by Industrial Electronic Engineers, Inc., 5528 Vineland Avenue, North Hollywood, California. This particular unit known as a "Series–10, Standard Rear Project Readout" display the decimal numeral by selectively energizing lamps at the rear of the unit.

It should be particularly understood that FIG. 7 only represents a small portion of what would normally be a much larger group of display units. An important advantage of the invention is the fact that substantial savings are realized because of the "memory" function and the ability to multiplex the displays since the same output from the computer control can be used for different displays thus saving on valuable computer circuits. As an example a group of 64 decoders without multiplexing will require 256 input circuits whereas multiplexing reduces the number to 32. By making up the display units as units which can be plugged in at a master console and incorporating the translating circuit in printed board form with the latching relays plugged into the printed board, field maintenance and repair is reduced to an absolute minimum. Defective circuits if ever present are easily traced though as compared to the prior art the circuit of the invention exhibits both ruggedness and reliability. Furthermore, there is no transfer of "noise" between translating circuits and the normal requirement of having to "reset" the translating circuit between displays is eliminated since the operation of the translating circuit as previously explained goes through a reset O before each new display.

I claim:

1. In a translating circuit for converting binary signals to decimal signals, in combination:

1. a plurality of input conductors for receiving a combination of binary signals corresponding to a binary number;
2. a plurality of output conductors for receiving the output of said circuit on one of said output conductors in the form of a decimal signal corresponding to said binary number;
3. a plurality of latching relays having associated sets of latching and unlatching coils and singular and plural groups of arm members arranged in a tree relay grouping for the establishment of a selected conducting path to a selected said output conductor, said unlatching coils when energized being operative to unlatch said arms within a predetermined short time period;
4. a control nonlatching relay having an operating coil and an associated set of normally open contacts and a set of normally closed contacts, said operating coil when energized being operative after said short time period and within a longer brief time period to close said normally open and to open said normally closed contacts;
5. external control means having an associated set of master control contacts; and
6. an operating source of potential;

said binary input and decimal output conductors, said latching and unlatching coils, said control relay normally open and normally closed contacts, said master control contact and said source of potential being connected such that upon the impression of a selected combination of binary signals on said input conductors and the closing of said master contact, said control relay operating coil is energized, said unlatching coils are all caused to be simultaneously energized through said normally closed contacts and said arms are all unlatched from their immediately prior positions and are brought to positions within said short time period effective to establish a first conducting path through said arms and to produce an operating potential on that output conductor corresponding to decimal zero, following said short time period but within said longer brief period those said latching coils which are connected to the respective said binary input conductors on which the said binary signals are impressed are caused to be energized while the remaining said latching coils remain deenergized and the said arms are brought to positions effective to establish a second conducting path through said arms and to produce an operating potential on that output decimal conductor corresponding in decimal notation to the said binary signal combination and such that following opening of said master contact after establishment of said second path said normally open and normally closed contacts are restored to their respective normal positions while said arms maintain said second path and the operating potential produce thereon, said translating circuit thereby exhibiting the capability of holding the last decimal signal on said second path so long as said master contact remains open and independent of new binary signal combinations being impressed, removed or changed on said input conductors and upon a further closing of said master contact being adapted to repeat said sequence of going to decimal zero prior to establishment of a new decimal signal.

2. In a translating circuit as claimed in claim 1 wherein said output conductors are each connected to an individual numerical decimal display means and the said operating potentials produced on said output conductors are connected to drive said displays.

3. In a translating circuit as claimed in claim 1 wherein said short and brief time periods are in the order of 5 and 15 milliseconds respectively.

4. A translating circuit for converting binary signals to decimal signals by receiving selected singular and plural binary signal combinations on a set of input conductors and dependent on the selected binary combination selectively closing a circuit path to one of a set of output conductors corresponding in decimal notation to the selected binary combination, comprising:

1. a plurality of latching relays having latching and unlatching coils and associated singular and plural groups of arm members, each said latching coil being connected to a selected input conductor and said arms being arranged to provide said circuit path to a selected output conductor dependent on the energization of said latching and unlatching coils;
2. a control nonlatching relay having an operating coil and associated sets of normally open and normally closed contacts;
3. an external control having an associated set of master control contacts; and
4. an operating source of potential;

said latching relays being arranged in a tree relay grouping and in combination with said control relay contacts, external control contacts and source of potential being connected such that closing of said external control contacts causes all of said unlatching coils to be energized and said arm members to establish a first conducting path through said arms to produce an operating potential on that output conductor corresponding to decimal zero, then causes these particular said latching coils to be energized which are associated with input conductors having binary signals impressed thereon and said arm members to establish a second conducting path through said arms to produce an operating potential on that output conductor corresponding in decimal notation to the said binary signal combination then on said input conductors, and following opening of said external control contacts causing said latching and unlatching coils to be deenergized and said second path and the operating potential thereon to be maintained thereby allowing the binary input combination to be changed while said second path potential is maintained preparatory to said external control contacts being reclosed, said first path being reestablished and then a third path established through said arms corresponding to the last entered binary combination.